Patented Oct. 4, 1932

1,880,968

UNITED STATES PATENT OFFICE

JOHN KEARSLEY MITCHELL, OF VILLANOVA, PENNSYLVANIA, ASSIGNOR TO DISPERSIONS PROCESS, INC., OF DOVER, DELAWARE, A CORPORATION OF DELAWARE

PROCESS OF PURIFYING BODIES INSOLUBLE IN WATER

No Drawing.  Application filed November 30, 1928. Serial No. 322,954.

There are various solid bodies, and more especially those falling into the amorphous organic class, which are insoluble in water and so cannot be purified by dissolving them to form an aqueous solution and then precipitating or crystallizing them from solution. Some of these bodies are liquefiable by heat and may be purified in hot liquid condition by filtration, but there are some bodies which undergo decomposition when heated, and so cannot be purified by this method. For instance, there is a large class of bodies which may be generally termed "rubbers" or "gums," which are insoluble in water and which cannot be liquefied. The purification of these bodies has therefore been a matter of considerable difficulty and expense.

Most of the wild rubbers, including those which are vulcanizable and known as true rubbers and those which are non-vulcanizable, such as the guttas, are gathered and coagulated by natives who pay little attention to the cleanliness of their product. Some natives have even been known to introduce bark and other foreign materials into the rubber to increase its apparent weight. So, too, when rubber is extracted from shrubs or the like, it is usually contaminated with fibrous material and other impurities.

Wild rubber, even when washed on the field before shipment, usually appears on the market associated with impurities and must again be washed before manufacture into rubber goods. The presence of even a small amount of coarse impurities in the rubber is usually objectionable, as these may appear in the finished goods and render them defective. It is generally the custom to wash rubber by working it between a pair of corrugated rolls rotating at different speeds, and playing water into the nip of the rolls to wash out the impurities thus brought to the surface. The cost of so washing depends upon the amount of impurities present in the rubber, and the cleanliness desired in the final product, but even when such washing is done for a long while, it does not yield a product substantially free from impurities. In the chewing gum industry, where it is essential that the rubber or gum base be of high purity, it has been found preferable to wash in a so-called internal mixer of the Day or Werner & Pfleiderer type, as such mixers by their kneading and pulling action expose impurities at a much higher rate than rolls. But washing so carried out is also expensive and time-consuming.

In accordance with the present invention, bodies such as described, (e. g., wild rubbers such as Para and African rubber, guttas, guayule, or the like), which are insoluble in water, are dispersed as fine particles in a liquid medium, impurities associated with such bodies thus becoming suspended in the dispersion, whereupon the impurities may be removed as by passing the dispersion over screens of sufficiently fine mesh to permit the dispersed particles and liquid medium to pass through while impurities remain on the screens. Such a process is especially useful in effecting the purification of rubber associated with impurities. The rubber may be dispersed by manipulating it in the presence of a hydrophilic colloid and water until it disperses in the aqueous medium as particles in the order of magnitude of the rubber globules of latex. The dispersion contains the dirt, bark, or other impurities in suspension therein, so that they may be removed by screening, whereupon the rubber may be coagulated and recovered from the dispersion, or, if desired, used in dispersed form. Preferably, the hydrophilic colloid used as a dispersing agent is water-soluble, so that when desired it may be readily removed from the coagulum by washing.

The process of the present invention may find various useful applications, as, for instance, in cleaning wild rubber intended for use in the manufacture of rubber goods or in conditioning a rubber or gum for use as a base in the manufacture of chewing gum. The rubber used for this latter purpose is usually one of quite high resin content, as these have been found to have the desired chewable quality. Such resinous rubber may be dispersed in water quite readily, requiring comparatively little manipulation in the presence of water and water-soluble hydrophilic colloid, such as soap, to undergo the desired change from the condition of a coherent body in the continuous phase to that of fine particles in the disperse phase, and the rubber may then be recovered from the dispersion as a coagulum, which may be washed sufficiently free of colloid to have substantially no effect on its use as a chewing gum base. In fact, in some cases, there may be a sufficient quantity of saponifiable material, perhaps of a resinous nature, present in the rubber or gum to effect its dispersion upon the addition of only a sponifying agent and water. A procedure intended to yield a product of this character may be carried out substantially as follows. A gutta or a mixture of guttas or gums compounded on a rubber mill, such as gutta Siak, gutta Soh, gutta Kay or Pontianacs, may be employed as a raw material. The rubber may then be put into a suitable manipulating apparatus, such as a mixer of the Ross, Day, Werner & Pfleiderer or Banbury type, the mixer then being set in operation. While the mixer is in operation, about 10% by weight of a soap, such as sodium resinate, may be added and uniformly disseminated throughout the mass, or may be formed in situ, whereupon water may be slowly added and worked into the mixture until the rubber disperses as fine particles in the aqueous medium. The dispersion is thus effected without the necessity of raising the temperature of the material to its melting point or to any point which would be likely to injure or modify the characteristics of the gum or gutta constituents of the mass which remains solid during dispersion. The resulting dispersion may have a solids content of about 40% and will be of a fluidity sufficient to permit it to be screened to remove impurities suspended therein. For instance, the dispersion may be caused to flow against screens, for instance, of the stationary, vibrating, or oscillating type, and of any desired fineness, say 300-mesh, the dispersed rubber and water passing through the screens while impurities remain on the screens. If desired, the impurities may be removed in portions of progressively decreasing coarseness, by using a succession of screens of successively finer mesh, say, 80 to 300 mesh. This avoids plugging of the fine screens by the coarsest impurities. The screened dispersion is characterized by its smoothness and cleanliness, and its rubber content when coagulated is of extremely fine texture. Coagulation may be effected by various methods. For instance, the water content of the dispersion may be removed by evaporating as by drum- or spray-drying. The soap present in the coagulum may, if desired, be readily removed by washing on the usual washing rolls to produce a substantially pure product. Or the rubber may be coagulated from the dispersion by the addition of suitable electrolytes, such as a solution of calcium chloride or acetic acid, or by the use of any of the well known coagulating agents, the coagulum then being washed free of the electrolyte and soluble products of coagulation, if desired, by washing as previously described. Still another method by which coagulation and washing may be simultaneously effected is to dilute the dispersion with a comparatively large amount of water, in which case the dispersed rubber particles coagulate or cohere into agglomerates which are suspended in the dilute aqueous medium and which may be removed by screening or may be brought down as a coherent mass by heating. The last method may be carried out in actual practice at comparatively low expense, as the dispersion may be added slowly, as for instance, in the form of a spray, into a large body of agitated water, whereupon the suspended rubber agglomerates may be removed by any suitable method such as screening, or centrifugal action, and then dried to produce a coherent mass; or the agglomerates may be caused to coalesce into a coherent mass, by heating the suspension of agglomerates or by maintaining the body of diluting water into which the dispersion is being delivered at elevated temperature. After drying, no odor or taste of soap can be detected in the coagulum, as substantially all of the soap present in the dispersion remains dissolved in the large quantity of diluting water necessary to effect agglomeration and coagulation. The dry coagulum is eminently satisfactory for use as a base in the manufacture of chewing gums, as it may be directly compounded with sugar, flavor, and other ingredients customarily used for such products.

While the foregoing example has to do with the processing of non-vulcanizable rubbers suitable for chewing gum manufacture, vulcanizable rubbers may be similarly processed for use in the manufacture of rubber goods, but in such case the colloid may be left in the resulting product. If desired, the screened rubber dispersion may be used as such in the manufacture of various products, as, for example, in the impregnation or coating of fabrics or other fibrous foundations. Or the dispersion may be incorporated into fibrous pulp in the beater engine, and the rubber coagulated on the fibers before the pulp is sheeted on a paper machine or otherwise fabricated, or it may be used for any of the many other purposes for which such dispersions are suitable.

Hydrophilic colloids other than soaps, such as casein, albumin, colloidal clay, or the like, may be successfully used, soaps, however, being preferable in cases where it is desired to produce a final product substantially free from any added colloid. Such soaps may be used in prepared condition as described, or they may be formed in situ in the rubber by incorporating thereinto soap-forming substances, such as rosin, pine tar, fatty acids or fatty acid glycerides, and then adding an alkali such as caustic soda to effect saponification.

Having thus described certain embodiments of this invention, it should be evident to those skilled in the art that various changes and modifications might be made therein without departing from the spirit or scope of invention as defined by the appended claims.

I claim:

1. A process of purifying wild rubber and like substances associated with impurities occurring in the crude product, which comprises manipulating the rubber in the presence of water and a hydrophilic colloid until it disperses as fine solid particles in the aqueous medium in which the impurities are then suspended, screening the dispersion to remove impurities, adding the screened dispersion to a body of heated water to coagulate the dispersed rubber, removing the coagulum, and drying.

2. A process of purifying wild rubber and like substances associated with impurities occurring in the crude product, which comprises manipulating the rubber in the presence of water and a water-soluble soap until it disperses as fine solid particles in the aqueous medium in which the impurities are then suspended, screening the dispersion to remove impurities, and spraying the dispersion into a body of heated water under agitation to coagulate the rubber and remove soap therefrom.

3. A process of purifying wild rubber and like substances associated with impurities occurring in the crude product, which comprises manipulating the rubber in the presence of water and a water-soluble soap until it disperses as fine solid particles in the aqueous medium in which the impurities are then suspended, screening the dispersion to remove impurities, spraying the dispersion into a body of heated water under agitation to coagulate the rubber and remove soap therefrom, removing the rubber coagulum, and drying.

In testimony whereof I have affixed my signature.

JOHN KEARSLEY MITCHELL.